United States Patent [19]

Beyer et al.

[11] 3,751,276

[45] Aug. 7, 1973

[54] REFRACTORY LAMINATE BASED ON NEGATIVE SOL OR SILICATE AND POSITIVE SOL

[75] Inventors: James N. Beyer; Earl P. Moore, Jr.; Robert L. Rusher, all of Wilmington, Del.

[73] Assignee: E. I. du Pont de Nemours and Company, Wilmington, Del.

[22] Filed: June 1, 1971

[21] Appl. No.: 148,956

Related U.S. Application Data

[63] Continuation-in-part of Ser. No. 49,916, June 25, 1970, abandoned.

[52] U.S. Cl. .................. 106/38.3, 117/29, 117/62, 117/70 D, 164/26
[51] Int. Cl. ............................................ C04b 35/14
[58] Field of Search ................... 161/162, 193, 206; 117/16, 29, 33, 62, 70 D; 164/26, 34, 41, 15, 24; 106/38.27, 38.3, 38.35, 38.9, 286; 252/313 SL

[56] References Cited
UNITED STATES PATENTS

| | | | |
|---|---|---|---|
| 3,270,382 | 9/1966 | Emblem et al. | 106/38.35 |
| 3,165,799 | 1/1965 | Watts | 106/38.35 |
| 3,007,878 | 11/1961 | Alexander et al. | 106/286 |
| 2,892,797 | 6/1959 | Alexander et al. | 252/313 |
| 3,012,973 | 12/1961 | Akins | 252/313 |
| 2,574,902 | 11/1951 | Bechtold et al. | 252/313 |
| 3,396,775 | 8/1968 | Scott | 164.26 |
| 3,292,220 | 12/1966 | Emblem et al. | 106/38.35 |
| 3,232,771 | 2/1966 | Pearce | 106/38.35 |
| 2,380,945 | 8/1945 | Collins | 22/188 |

*Primary Examiner*—Daniel J. Fritsch
*Attorney*—Don M. Kerr

[57] ABSTRACT

A rapid process for forming a refractory laminate on the surface of a support structure which comprises dipping the surface alternately, in either order, in (1) a bath comprising a sol of negatively charged colloidal particles and/or a solution of an alkaline ionic silicate and (2) a bath comprising a sol of positively charged colloidal particles, until a laminate of the desired thickness is built up on the surface. In order to increase the rate of laminate build up, particulate refractory material can be included in the baths and/or the coated surface can be stuccoed between dips. Interaction between the negatively charged colloidal particles or silicate and the positively charged colloidal particles results in a setting action which immobilizes the coatings as they are applied, thus making it unnecessary to dry between dips. The process is particularly suited for making expendable, refractory shell molds for precision investment casting of metals by the so-called "lost-wax" technique.

11 Claims, No Drawings

REFRACTORY LAMINATE BASED ON NEGATIVE SOL OR SILICATE AND POSITIVE SOL

REFERENCE TO RELATED APPLICATION

This application is a continuation-in-part of our co-pending application Ser. No. 49,916, filed June 25, 1970, now abandoned.

BACKGROUND OF THE INVENTION

This invention relates to a process for forming refractory laminates. The process is useful for a variety of purposes, but it was developed for and is particularly suited to the manufacture of expendable, refractory shell molds for precision investment casting of metals by the "lost-wax" or disposable pattern technique.

Refractory shell molds for precision investment casting are usually prepared by dipping a disposable pattern, which is a replica of the part to be cast, into a refractory slurry consisting of a suspension of fine refractory grain in a bonding liquid. The disposable pattern is usually wax or plastic and is solvent cleaned prior to dipping into the slurry. Other disposable materials such as low-melting tin-bismuth alloy and frozen mercury are sometimes employed for the pattern. The binder is generally capable of hardening during drying at room temperature. After dipping, the excess slurry is drained from the coated pattern and while the coating is still wet it is stuccoed with coarser refractory particles. The stuccoing is carried out by dipping the coated pattern into a fluidized bed of the refractory particles or by sprinkling the particles onto the pattern. The process of dipping and stuccoing is repeated until a refractory shell having sufficient thickness to resist stresses incurred in subsequent casting operations is built up around the pattern. The usual thickness of the shell is from one-eighth to one-half inch, although thinner or thicker shells may be produced. The completed pattern is usually dried under ambient conditions for 24 hours. The disposable pattern is then usually removed from the refractory shell mold by flash dewaxing furnaces, steam autoclaves, or boiling solvent baths. The refractory shell mold is then fired at 1,700°–1,900°F. to prepare it for metal casting.

In this conventional manner of making refractory shell molds the period of drying between coating applications may vary from 30 minutes to 4 hours depending on temperature, humidity, air flow and complexity of the pattern. This greatly increases the time and cost involved in making the molds. The drying problem is particularly difficult in recessed areas or "blind" cores (hollow openings, closed at one end). These refractory molds may dry only after many hours, since much of their surface area is not suitably disposed to drying by the atmosphere. Drying is necessary to harden the slurry coatings and to insure that subsequent coats will adhere to previous ones without sloughing away.

Another shortcoming of the conventional method of making shell molds is that when the slurry is dried microfractures often occur on hardening. When the next slurry coating is applied the binder in the slurry may flow through the stucco and either dissolve the slurry coating in part or cause it to flake.

Because of these shortcomings of the conventional mold forming processes, efforts have been made to develop chemical methods for rapid setting of the binder coatings, in order to eliminate the requirement of drying between dips and reduce the time interval between dips to a few minutes. One approach has been to use a gaseous reactant in order to set the binder. U.S. Pat. No. 2,829,060 discloses the use of carbon dioxide to set sodium silicate-bonded shells containing ammonia. U.S. Pat. No. 3,455,368 discloses the use of ammonia gas to set hydrolyzed ethyl silicate or acidified aqueous colloidal silica-bonded shells. U.S. Pat. No. 3,396,775 discloses the use of volatile organic bases in order to set shells bonded with hydrolyzed ethyl silicates.

Another approach has been to use an acidified aqueous colloidal silica to gel a basic colloidal silica and vice versa. In this approach both binders are negatively charged and gelation occurs because of pH changes. This system is described in a paper by Shipstone, Rothwell and Perry, "Drying Ceramic-Shell Moulds", British Investment Casters' Technical Association, 9th Annual Conference. However, systems based on gelling due to pH changes have not found wide spread acceptance because gelation is slow and the resulting wet gels are weak. This gives rise to sloughing-off of the early coats during subsequent dipping.

A third rapid setting approach in the art employs sodium silicate as the binder and mono-ammonium phosphate and magnesium oxide are in the stucco as a gelling agent. This is described in an article by Dootz, Craig, and Peyton, "Simplification of the Chrome-Cobalt Partial Denture Casting Procedure", J.Prosthetic Dentistry, Vol. 17, No. 5, pages 464–471, May 1967.

A fourth approach employs an ethyl silicate dip coat which is set with aqueous colloidal silica containing ammonia. This is disclosed in an article by Shepherd, "Adaptation of the Ceramic Shell Mould to Meet Mass Production Requirements", British Investment Casters' Technical Association.

A fifth approach has been to add a volatile, organic solvent to the silica sol. Relatively rapid gelling is obtained by allowing the solvent (usually an alcohol) to evaporate. For a simple casting the time required for evaporation may be only several minutes, but for a complex casting evaporation may require several hours, since diffusion of solvent from deeply recessed areas or blind core areas is slow.

Volatile solvents and gaseous ammonia present ventilation problems to the foundry. These problems have contributed to the slow acceptance of the present fast-setting systems.

In all of the prior art processes discussed above, it is difficult to obtain uniform coverage of the disposable pattern in the case of intricate parts containing deeply recessed areas or blind cores. Blind cores in particular are difficult to coat properly. Viscous slurries penetrate slowly, trapping air and easily blocking passage of slurry into the corners. This leads to defective castings and a high scrap rate. In the prior art fast-set shell processes the problem is magnified because it is necessary to get the setting agent in and out of the recessed areas and blind cores as well as the slurry itself. If the excess setting agent is not removed it will contaminate and reduce the life of the slurry bath. This is not a sudden dramatic step; instead there is a gradual deterioration of the bath stability and the quality of the shells produced. Getting chemical setting agents into and out of the recessed areas and blind cores is diffusion controlled and difficult.

SUMMARY OF THE INVENTION

This invention is a rapid process for forming a refractory laminate on the surface of a support structure which comprises dipping the structure alternately, in either order, in
1. a bath comprising at least one member of the group consisting of
   a. a sol of negatively charged colloidal particles of an inorganic substance and
   b. a solution of an alkaline ionic silicate, and
2. a bath comprising a sol of positively charged colloidal particles of an inorganic substance, until a laminate of the desired thickness is built up on the surface.

In a preferred embodiment one dip bath comprises a slurry of particulate refractory inorganic compound or metal (i.e. a refractory grain) in a sol of negatively charged colloidal silica particles and the other dip bath comprises a slurry of particulate refractory grain in a sol of positively charged colloidal particles composed of a silica core coated with a polyvalent metal-oxygen compound. In a particularly preferred embodiment the positively charged particles are composed of colloidal silica coated with alumina.

In the manufacture of expendable, ceramic shell molds for precision investment casting of metals by the process of this invention, a disposable pattern of the metal casting is dipped alternately into the baths as previously described. Preferably one dip bath comprises a slurry of refractory grain in a sol of negatively charged colloidal silica particles and the other dip bath comprises a slurry of refractory grain in a sol of positively charged alumina-coated colloidal silica particles. In a particularly preferred embodiment two positive sol slurries and two negative sol slurries are used. The slurries used for the first two coats (prime coates) contain relatively fine refractory grain and the slurries used for subsequent coats (back-up or follow-up coats) contain coarser refractory grain. The coated pattern is drained between each dip and is preferably also stuccoed between each dip with a relatively coarse refractory grain.

This invention also includes refractory laminates and refractory laminate articles, such as shell molds, made by the above-described process. The laminates comprise alternate layers of (1) a gel of at least one member of the group consisting of negatively charged colloidal particles of an inorganic substance and an alkaline ionic silicate and (2) a gel of positively charged colloidal particles of an inorganic substance. In a preferred embodiment, the negatively charged colloidal particles are colloidal silica particles, the positively charged colloidal particles are alumina-coated colloidal silica particles, and the gel layers contain and/or are separated by intermediate layers of particulate refractory metal or inorganic compound.

For the manufacture of refractory shell molds the process of this invention offers a number of advantages as compared to the above described prior art processes. Most importantly it is a rapid process because it is not necessary to dry between the dips. As soon as one coat has been stuccoed the coated pattern can be dipped in the next bath. When this is done an essentially instantaneous coagulation of the previous coat occurs. A dip of 5 seconds is sufficient to set the previous coat and add an additional layer. For practical reasons 5 seconds is too short and so a dipping time of 15 seconds to 1 minute is used. Thus a shell of eight coats is readily prepared in 10 minutes allowing ample time for drainage, stuccoing and transferring of the pattern from one slurry bath to the next. If for some reason one wished to drastically reduce this time it could be done.

Another advantage of this process is that the layers produced are unusually smooth and uniform in thickness regardless of the configuration of the pattern. Thus defects in the castings due to failure to coat deeply recessed areas or blind cores are avoided. It is believed that this is due (in part if not totally) to the fact that the coats or the layers of slurry are exhausted onto the previous coat through electrochemical attraction and not simply added on by wet pick up. In addition the process can be operated with slurries at lower viscosities than conventional slurries, and as a result passage through constricted openings is facilitated.

An advantage of this process over prior art rapid shell processes resides in the fct that it is not necessary to provide sufficient delay between dips to permit the chemical setting agent or volatile solvent to diffuse out of recessed and blind core areas because each slurry acts as a setting agent for the previous coat. Since no chemical setting agent is required there are no defects in the castings resulting from failure to adequately remove setting agent from recessed areas and blind cores. Nor is there any contamination of slurry baths due to inadequate removal of setting agent.

One of the most significant advantages of this invention is that the thickness of any layer deposited does not depend upon the viscosity of the slurry. High and low viscosity slurries give roughly the same shell thickness. Again this is believed to be attributable to the fact that the layers of slurry are exhausted onto the previous layers through electrochemical attraction rather than by wet pickup. Because of this feature it is possible to use low viscosity slurries. This is an advantage because high viscosity slurries penetrate slowly. Air trapped in deeply recessed areas or blind cores easily block the passage of a viscous slurry leading to "plus" metal in the casting. In the prior art processes it is not practical to use low viscosity slurries because they drain rapidly leaving very thin layers. To build up a shell with the desired thickness requires a very large number of dippings, making the cost prohibitive. In the prior art processes thin slurries also give weaker shells and poorer surface fidelity. In the present process use of lower viscosity slurries does result in shells of reduced strength and greater porosity. Thus, for large simple castings higher viscosity slurries are used, but for complex patterns, lower viscosity slurries can be used. Resulting lower strength will not matter since, in the deeply recessed areas and blind cores, the force of the molten metal is less. The increased porosity resulting from the lower viscosity slurry is beneficial since it facilitates water removal during final drying and air removal during metal pouring.

Other advantageous features of this invention will be mentioned in the description which follows.

DESCRIPTION OF THE INVENTION

The invention will now be described in detail with particular reference to its use in forming expendable, refractory shell molds for precision investment casting of metals.

Negative Sols

Among the negative sols which can be used in this invention are silica sols composed of substantially discrete, dense, non-agglomerated negatively charged, colloidal particles of silica dispersed in a suitable liquid medium. The concentration of silica in these sols can be as low as 5 percent and as high as 60 percent by weight. However, it is preferred that the silica content be at least 25 percent by weight. For the purposes of this invention, it is most preferred that the silica concentration be between 25 and 40 percent by weight.

The average diameter of the silica particles should be between about 1 and 150 millimicrons. It is preferred that the average silica particle diameter be in the range of 5 – 50 millimicrons and most preferred that it lie between 5 and 16 millimicrons.

The pH of the silica sol may range from 10.5 down to 7.5 or even lower with satisfactory results. The pH which is preferred is between 8.5 and 10, as in the commercial "Ludox" colloidal silica sols. It is not necessary however that the silica sol be basic, since the setting action in the process of this invention depends on interaction between negatively and positively charged binders, not upon pH changes. In an acid silica sol, as well as in a basic silica sol, the silica particles are negatively charged.

Positively charged stabilizing counter ions for the colloidal silica particles in the sols are $Na^+$, as in "Ludox" LS,HS,SM, and AM, $NH_4^+$, as in "Ludox" AS, $K^+$, $Li^+$ and quaternary ammonium. Silica sols whose particle surfaces have been modified with metal oxides to enhance negative character, such as Ludox AM with aluminate-modified silica, are useful.

Other negative sols can be used in place of silica sols. Examples include sols of naturally occurring clays of the bentonite, attapulgite, and kaolinite types.

The liquid medium for suspending the colloidal particles can be water, alone or mixed with low molecular weight water-miscible alcohols such as methanol and isopropanol or other polar organic liquides, or it can be one or more of these organic liquids free of water. The preferred medium for this invention is water.

Alkaline Ionic Silicates

Various types of alkaline ionic silicates have been found suitable for the process of this invention. Thus, alkali metal silicates as aqueous solutions can be used. Useful concentrations of silicate solids expressed as $SiO_2$, can vary from 1–50 percent or higher, with only the restriction imposed by excessive viscosity limiting utility. For the purposes of this invention the preferred concentration of $SiO_2$ is 5–30 percent.

The alkali metal silicates which are useful include the sodium, potassium and lithium silicates. In the case of the sodium and potassium silicates, $SiO_2:Na_2O$ and $SiO_2:K_2O$, molar ratios can be 2:1 or lower, up to 4:1 or higher; the preferred ratios are between 2.5:1 and 3.5:1. In the case of the lithium silicates the $SiO_2:Li_2O$ ratio can be 3.5:1 or less up to very high values such that the size of the molecules are well into the colloidal range.

In addition to alkali metal silicates, quaternary ammonium silicates can be used. Mixtures of alkaline ionic silicates and collidal silicas can also be used.

Positive Sols

In the process of this invention a disposable pattern is alternately dipped into a bath comprising a negative sol and/or a solution of a silicate, as just described, and a bath comprising a positive sol, i.e. a sol of positively charged colloidal particles. Preferably the positively charged colloidal particles are composed of a silica core coated with a polyvalent metal-oxygen compound. The sols of the latter type are fully described in U.S. Pat. No. 3,007,878. As indicated in this patent the polyvalent metal-oxygen compound which can be used to provide a positive surface charge on colloidal silica particles can be any compound of the class of metal oxides, metal hydroxides and hydrated metal oxides of trivalent aluminum, chromium, gallium, indium, and thallium or tetravalent titanium, germanium, zirconium, tin, cerium, hafnium and thorium. Because of cost it is preferred that the positive sol be an aqueous dispersion of alumina-coated colloidal silica particles of the type illustrated in FIG. 1 of U.S. Pat. No. 3,007,878.

An example of a charged alumina-coated silica sol which is particularly useful in this invention is one in which there is one mole of aluminum per mole of surface silica and which is prepared by the following process:

Two Hundred Sixty-four lbs. of Ludox HS colloidal silica containing 40% $SiO_2$ by weight, the silica particles having an average particle size of 12–15 millimicrons and a specific surface area of about 215 $m^2/g$. $SiO_2$, is adjusted to pH 7.50 with 821 grams of 1:1 mixture of a concentrated hydrochloric acid in water. The sol is mixed with 62.8 lbs. of 50 percent chlorohydrol ($Al_2(OH)_5Cl$) and 61.7 lbs. of water by introducing it at a rate of 25 lbs./minute into a centrifugal pump circulating the basic aluminum shloride solution. The clear fluid intermediate product is heated to 60°C. in one-half hour and at 60°C. for 2 hours, cooled to 20°C., and stirred with a Lightnin mixer as well as circulated with the pump as 600 grams magnesium hydroxide dispersed in 1,800 grams water is introduced in 5 minutes to bring the pH to 5.65. Agitation and circulation are continued for 2 hours. The clear stable produce contains 26.4% $SiO_2$, 4.2% $Al_2O_3$, 1.0% Cl and 0.23% MgO. The mole ratio of aluminum to surface $SiO_2$ is 1:1. The pH of the product after several weeks aging is 4.60, the viscosity is 15 cps, and the specific gravity at 25°C. is 1.23. This product (referred to hereinafter as Positive Sol 130M), is the positive sol which is used in the examples (except IX), set forth hereinbelow.

Positive sols of the preferred type exhibit two unique chemical properties which make them highly satisfactory for use in this invention:

1. At a pH higher than about 6.0, the charged alumina coating further polymerizes, causing rapid aggregation of the colloidal particles and producing a still gel structure.

2. The affinity of the charged colloidal particles for negative materials such as colloidal silica and silicates is very strong.

These two effects combine to produce strong, tough gel polymers. It is the integrity of these gels which enable molds to be prepared rapidly by alternating positive and negative coatings without intermediate dryings.

Positive Sol 130M is stabilized by chloride ion. As described in U.S. Pat. No. 3,007,878 other anions, such as formate, acetate, lactate, nitrate, bromide, perchlorate, bromate and trichloroacetate, can be used instead of chloride.

Other positive sols can be used in this invention in place of the sol composed of colloidal silica particles coated with polyvalent metal-oxygen compound. In particular, sols from a number of commericially available dispersible colloidal aluminas such as "Dispal" (Continental Oil Co.), "Alon G" (Cabot Corp.) and "Super-Ox" (Merkl Research Co.), can be used.

Refractory Grain

In building shell molds in accordance with this invention, any finely divided refractory material may be used provided that it does not react with the binders. Among suitalbe refractory materials are zircon, molochite, fused silica, sillimanite, mullite and alumina. To obtain castings with a smooth surface finish, all the refractory grain in the primary or first coating composition should pass a 100-mesh sieve and preferably 85 percent should pass a 200-mesh sieve. Even finer mesh refractory may be employed for better surface finish and it is preferred in most instances. In subsequent coatings the refractory may be much coarser but it is preferred that all the material pass a 100-mesh sieve. These mesh sieve numbers correspond to the Standard U.S. Sieve Series.

The refractory material used for the stucco is preferably a coarser grade of the same refractory grain used in the slurry composition. For example, if refractory in a prime coat slurry is zircon with approximately 75 percent passing the 325-mesh sieve, the refractory used for the stucco can also be zircon in the range of −80 to 140 mesh. It is not essential, however, that refractory material of the same composition should be used for both the stucco and the slurry. Examples of refractory materials suitable for stucco are zircon, zirconia, sillimanite, mullite, fused silica, alumina and fire clay grog.

Slurries

Preparation of the coating slurries requires that a minimum of two refractory coating slurries be prepared, one for the positive sol binder and the other for the negative sol or silicate binder. These are normally used for the prime coat but can be used for the back-up or follow-up coats as well. In most instances less expensive refractories are used for the back-up coats and consequently two additional slurries are used, again one containing positive sol binder and the other containing colloidal silica binder. Molochite, an aluminosilicate, is frequently used as the back-up coat for a zircon prime coat, and a slightly coarser grade of a fused silica powder is used as the back-up coat for a finer fused silica prime coat.

A discussion of the preparation of some specific slurries which are useful in the practice of this invention follows. In these slurries the positive sol is Positive Sol 130M, described hereinabove, and the negative sol is Ludox SM-30, a basic, aqueous silica sol which contains 30 percent colloidal silica with an average particle size of about 7 m$\mu$.

Zircon

The zircon slurries used in the zircon-molochite slurry system employ a finely ground zircon flour (No. 3 Grade from Casting Supply House). This flour is described as −325 mesh, since approximately 75 percent passes through this screen. This flour is mixed with positive sol in one instance and with silica sol in another to make prime coat slurries. The resulting coatings are very smooth, dense and inert to molten metals and alloys, and possess good thermal stability to 2,500°F. and above.

In making the positive sol-zircon slurry the flour is added to the positive sol and to any water, if needed, while mixing. A propeller-type agitator is suitable for this purpose. Slurry equilibrium is usually reached after a few hours of agitation, although high shear mixing of a new batch is not recommended because of overheating. The combination of low slurry viscosity and zircon's high density can cause the grain to settle out unless sufficient agitation is maintained. The best slurry working temperature is 75°–85°F.

The silica sol-zircon slurry is mixed in the same manner as in the positive sol-zircon slurry. After mixing is completed, a wetting agent such as Ultrawet 60L (Atlantic Refining Company) may be added to this collidal silica-zircon slurry to improve flowability. If the first dipping of the pattern is in this slurry, the wetting agent will also improve wettability of the slurry onto the pattern. If, however, the pattern is first dipped into the positive sol-zircon slurry, the wetting agent is not needed in the colloidal silica-zircon slurry. To minimize foaming when a wetting agent is used, the quantity should not usually exceed 0.05 percent by weight of the colloidal silica.

The zircon slurries will function over a wide range of viscosities for the positive sol-zircon slurry. The viscosities obtained at 80°F. with a No. 4 Zahn Viscosimeter are in a range of 5–12 seconds and more preferably in a range of 8–10 seconds. Similarly, for the colloidal silica-zircon slurry, the viscosities obtained at 80°F. with a No. 4 Zahn cup are in the range of 11–21 seconds and more preferably in the range of 15–17 seconds.

Molochite

The molochite slurries employed in the zircon-molochite slurry systems are a coarser flour than the No. 3 zircon flour. This flour (No. 6 Molochite, from Casting Supply House) is defined as being −200 mesh so as approximately 75 percent will pass the 200 mesh screen. No. 6 Molochite is mixed with positive sol binder in one instance and with colloidal silica binder in another to make slurries for the back-up or follow-up coats.

The positive sol-molochite slurry and the silica sol-molochite slurry are made in the same manner as the zircon slurries. No wetting agent is required for either slurry since very few, if any, wetting problems are encountered with back-up slurries. Only a few hours of mixing is required to attain slurry equilibrium. The best slurry working temperature is in the range of 75°–85°F. At 80°F. on the positive sol slurry the viscosity obtained with a No. 4 Zahn cup is in the range of 5–11 seconds and more preferably 7–8 seconds. At 80°F. viscosity of the alkaline silica sol slurry obtained with a No. 4 Zahn cup should be 7–14 seconds and more preferably 9–11 seconds.

Fused Silica

Two different particle sizes of "Nalcast" fused silica (Nalco Chemical Company) are used for dip slurries. These are Nalcast P1W fused silica flour and Nalcast P-2 fused silica flour.

Nalcast P1W flour has a wide particle size distribution and is used with positive sol in one instance and also with colloidal silica sol in the other to prepare thick slurries for the inner or prime shell coats. Nalcast P1W is defined as −200 mesh since all the grains will pass through a 200 mesh sieve and approximately 75 percent will pass a 325 mesh sieve.

In making the silica sol slurry the silica sol is added along with the calculated amount of water to the mixing container. With good agitation about 85 percent of the calculated Nalcast P1W flour will stir in readily. The last portion is added in small increments. The use of efficient mixing equipment will permit the preparation of a suitable slurry in a few hours. The stirrer should be stopped for periods to allow the entrapped air bubbles to rise to the surface and break. Care should be taken that stirring is not carried out with excessive shear such that the slurry overheats from the friction generated. The best slurry working temperature is 75°-85°F.

After mixing is completed a wetting agent such as Ultrawet 60L may be added to the slurry to improve flowability. If the first dipping of the pattern is in this slurry the wetting agent will also improve wettability of the slurry onto the pattern. If the pattern is first dipped into the positive sol-fused silica slurry the wetting agent is not needed in the colloidal silica-fused silica slurry. To minimize foaming where a wetting agent is used, the quantity should not usually exceed 0.05 percent by weight of the colloidal silica. This fused silica slurry will function over a wide range of viscosity but a suitable viscosity measured with a No. 4 Zahn cup at 80°F. ranges from 25-35 seconds and more preferably 29-31 seconds.

The positive sol-fused silica slurry is made in a similar manner. In this instance technical grade (70 percent) hydroxyacetic acid is added to the positive sol at approximately 2 percent by weight based on positive sol commodity, in order to maintain its viscosity. The apparent chemical function of the acid is to complex with ionic impurities, especially those arising from iron in the silica, which have a destabilizing effect upon positive sol. Mixing is accomplished in the same manner as for the silica sol slurry. In this instance, however, no wetting atent is added since the positive sol serves this purpose. Again, the No. 4 Zahn cup viscosity value at 80°F. is in the range 25-35 seconds and more preferably 29-31 seconds.

Nalcast P-2 flour is a coarser powder than Nalcast P1W and is defined as −100 mesh since all will pass through a 100 mesh screen and approximately 45 percent will pass a 325 mesh screen. Nalcast P-2 flour is used with the positive sol binder in one instance and with the colloidal silica sol binder in the other, to make slurries for forming the back-up or outer shell coats.

The colloidal silica and positive sol- Nalcast P-2 slurries are made in the same manner as the corresponding Nalcast P1W slurries. However, the Nalcast P-2 slurries are easier to mix because Nalcast P-2 flour is coarser than Nalcast P1W and the slurries are made less viscous. No wetting agent is needed for either slurry. For both the colloidal silica- Nalcast P-2 slurry and the positive sol- Nalcast P-2 slurry, the viscosities as determined on the No. 4 Zahn cup at 80°F. are in the range 12-25 seconds and more preferably in the range 15-18 seconds.

The broad ranges of composition along with the more preferred ranges of compositions for prime and back-up coats in both the zircon-molochite and Nalcast fused silica systems just discussed are given in Tables I-IV.

TABLE I
ZIRCON PRIME COATING MATERIALS

| Prime Coat Slurry A | Composition, parts by weight | |
|---|---|---|
| | Broad Range | Preferred Range |
| Zircon Refractory Flour 325 Mesh | 86–50 | 86–67 |
| Aqueous Positive Sol | 14–50 | 14–33 |
| Extra Water | As Needed | None |
| pH | 4.3–4.8 | 4.3–4.8 |
| Viscosity, No. 4 Zahn Cup, Sec. | 5–12 | 6–11 |
| Colloidal Particle to Refractory Flour Ratio | 0.05–0.30 | 0.05–0.15 |
| Prime Coat Slurry B | | |
| Zircon Refractory Flour, 325 Mesh | 86–50 | 86–67 |
| Colloidal Silica Aquasol | 14–50 | 14–33 |
| Ultrawet 60L | 0.05 per 100 parts SiO₂ sol (Max.) | 0.05 per 100 parts SiO₂ sol (Max.) |
| Extra Water | As Needed | None |
| pH | 9.6–9.9 | 9.6–9.9 |
| Viscosity, No. 4 Zahn Cup, Sec. | 11–21 | 14–18 |
| Colloidal Particle to Refractory Flour Ratio | 0.05–0.30 | 0.05–0.15 |

TABLE II
MOLOCHITE BACK-UP COATING MATERIALS

| Back-Up Slurry C | Composition, Parts by Weight | |
|---|---|---|
| | Broad Range | Preferred Range |
| Molochite Refractory Flour, 200 Mesh | 75–50 | 65–50 |
| Aqueous Positive Sol | 25–50 | 35–50 |
| Extra Water | As needed | None |
| pH | 4.5–5.0 | 4.5–5.0 |
| Viscosity, No. 4 Zahn Cup, Sec. | 5–11 | 7–9 |
| Colloidal Particle to Refractory Flour Ratio | 0.10–0.335 | 0.16–0.30 |
| Back-Up Slurry D | | |
| Molochite Refractory Flour, 200 Mesh | 75–50 | 65–50 |
| Colloidal Silica Aquasol | 25–50 | 35–50 |
| Extra Water | As needed | None |
| pH | 9.8–10.1 | 9.8–10.1 |
| Viscosity, No. 4 Zahn Cup, Sec. | 7–14 | 9–12 |
| Colloidal Particle to Refractory Flour Ratio | 0.10–0.335 | 0.16–0.30 |

TABLE III
"NALCAST" P1W PRIME COATING MATERIALS

| Prime Coat Slurry A | Composition, Parts by Weight | |
|---|---|---|
| | Broad Range | Preferred Range |
| "Nalcast" P1W Fused Silica, 200 Mesh | 75–60 | 75–69 |
| Aqueous Positive Sol | 10–40 | 10–31 |
| Extra Water | 15–0.0 | 15–0.0 |
| Hydroxyacetic Acid (70%) | 1.0–3.0 | 0.5 |
| pH | 3.8–4.2 | 3.8–4.2 |
| Viscosity, No. 4 Zahn Cup, Sec. | 25–35 | 25–32 |
| Colloidal Particle to Refractory Flour Ratio | 0.04–0.20 | 0.04–0.14 |
| Prime Coat Slurry B "Nalcast" P1W Fused Silica, 200 Mesh | 75–60 | 75–69 |
| Colloidal Silica Aquasol | 10–40 | 10–31 |
| Ultrawet 60L | 0.05 per 100 parts SiO₂ sol (Max.) | 0.05 per 100 parts SiO₂ sol (Max.) |
| Extra Water | 15–0.0 | 15–0.0 |
| pH | 9.6–9.9 | 9.6–9.9 |

| | | |
|---|---|---|
| Viscosity, No. 4 Zahn Cup, Sec. | 25–35 | 25–32 |
| Colloidal Particle to Refractory Refractory Flour Ratio | 0.04–0.20 | 0.04–0.14 |

TABLE IV.

"NALCAST" P-2 BACK-UP COATING MATERIALS

| | Composition, Parts by Weight | |
|---|---|---|
| Back-Up Slurry C | Broad Range | Preferred Range |
| "Nalcast" P-2 Fused Silica, 100 Mesh | 75–53.5 | 75–60 |
| Aqueous Positive Sol | 10–46.5 | 25–40 |
| Extra Water | 15–0.0 | None |
| Hydroxyacetic Acid (70%) | 1.0–3.0 | 0.5–0.4 |
| pH | 3.8–4.2 | 3.8–4.2 |
| Viscosity, No. 4 Zahn Cup, Sec. | 12–25 | 15–19 |
| Colloidal Particle to Refractory Flour Ratio | 0.04–0.26 | 0.10–0.20 |
| | | |
| Back-Up Slurry D | | |
| "Nalcast" P-2 Fused Silica, 100 Mesh | 75–53.5 | 75–60 |
| Collidal Silica Aquasol | 10–46.5 | 25–40 |
| Extra Water | 15–0.0 | None |
| pH | 9.6–9.9 | 9.6–9.9 |
| Viscosity, No. 4 Zahn Cup, Sec. | 12–25 | 15–19 |
| Colloidal Particle to Refractory Flour Ratio | 0.04–0.26 | 0.10–0.20 |

Adjustment of the slurries to a suitable working viscosity range is carried out by adding water or refractory flour as needed. In the more preferred ranges of colloidal particle to refractory flour ratios water or refractory flour additions are rarely needed in preparing the slurries, but for the lower ratios some additional water is generally required. Over the working life of the slurries frequent water additions are made to maintain proper consistency in order to compensate for water loss by evaporation.

The working viscosities are low initially and this enhances ready penetration of the slurries into recessed areas or blind cores of patterns providing proper filling with slurry and preventing air entrapment, sometimes obtained with high viscosity slurries.

The pH of the slurries as indicated in the Tables is measured with a Beckman Zeromatic II pH meter using a Beckman 39301 glass electrode and a Beckman 39402 Calomel reference electrode. The reported pH values are those of the slurries as mixed. These values are not critical and no significant pH change is observed in the working life of the slurries up to several weeks.

In the Nalcast fused silica slurries, both the prime coat and back-up coat viscosities are higher than those employed in the zircon-molochite system. However, these fused silica slurry viscosities are less than those normally used in the Nalcast -aqueous colloidal silica system. The lower viscosities aid in wetting out and uniformly building up rcessed areas and blind cores on wax patterns.

Pattern Materials and Cleaning

Conventional wax and plastic expendable patterns of the object to be reproduced in metal are prepared. These patterns are then affixed to a sprue and runner system, giving the usual cluster arrangement needed to produce them in multiple. The pattern assembly or cluster is cleaned with a suitable solvent such as methyl ethyl ketone, trichloroethylene or alcohol mixtures to remove soil and release agents used in their preparation. The solvent cleaned assembly is dried and as such is ready for dipping in the prime coat slurry. In those instances where the colloidal silica prime coat slurry is first used and where wettability is a problem, a one to two percent "Cab-O-Sil" M–5 (Cabor Corp.) solution in isopropanol provides a thin hydrophilic film which vastly improves wettability. This Cab-O-Sil coating, however, must be dried before dipping the pattern assembly into the slurry. Cab-O-Sil is a silica aerogel made by flame hydrolysis of silicon tetrachloride.

Although wax and plastics are the preferred expendable pattern materials others such as low-melting tin-bismuth alloys may also be employed.

Dipping

In the shell building process a solvent cleaned, expendable pattern assembly such as wax is alternately dipped into a prime coat slurry of positive sol and refractory flour and also into a prime coat slurry of colloidal silica or alkaline anionic silicate and refractory flour. The pattern assembly is dipped and thoroughly wetted in the prime coat slurry, withdrawn, drained and rotated to insure complete coverage in recessed areas or in blind cores. Stuccoing of the wetted pattern assembly is carried out after each dipping operation, usually with a somewhat coarser grain of the same refractory as used in the slurry. After completing the dipping in the second prime coat slurry and stuccoing, the dipping prcess is continued alternately in backup slurries of positive sol and refractory flour and also in colloidal silica sol or alkaline anionic silicate solution and refractory flour. Again stuccoing is carried out after these dipping operations with a still somewhat coarser grain than that used for the prime coat stucco. The backup slurry and stucco, again, may or may not be of the same grain system used in the prime coat.

Usually two prime coats, one from the positive sol slurry and one from the negative colloidal silica sol slurry, suffice to give a quality prime coat suitable for metal casting. Also six to eight backup coats are usually added to these patterns giving a total of eight to 10 coats. However, as little as a total of four coats or even less can be employed or as much as 30 coats or more, depending upon wax patterns assembly, pattern size and configuration. The large number of coats can find application in making shells for massive castings not usually made by the precision investment casting technique.

The shell building process can be started with either positive sol slurry or the negative colloidal silica sol slurry. It is necessary, however, to continue to alternate from positive sol to negative sol in order to prevent coatings from sloughing away, as occurs when either a positive sol slurry dip is followed after stuccoing by a like dip or when a negative sol slurry dip is followed after stuccoing by a like dip. Usually it is advantageous to start with the positive sol slurry because of its hydrophilic nature and compatibility with wax.

The dipping time is not critical - 5, 10, 20 and 90 seconds give quality shells. The dipping time required is a function of the complexity of the pattern assembly, but 10 to 60 seconds per dipping operation is typical. Time required to produce a shell with eight to 10 coats total will be in the range from 10 to 15 minutes, allowing time for drainage and stuccoing. Shells requiring 30 coats are made well within 1½ hours.

A means of decreasing binder costs without loss in shell construction time is afforded by the substitution of sodium silicate or other alkaline ionic silicate for colloidal silica in the backup slurries. For low melting alloys, such as aluminum, brasses and bronzes, where prime coat refractoriness is of a lesser consideration, sodium silicate can also be substituted for colloidal silica in the prime coat slurries as well.

Drying

After the final dipping operation the shell assembly is ready for drying. Drying under ambient conditions for 18 to 24 hours is sufficient to drive off the bulk of the water enabling the assembly to be dewaxed without blistering or exhibiting cracks. Under controlled temperature and humidity conditions of 75°F. and 40 percent relative humidity, 85–90 percent of the total amount of water present is evaporated after 24 hours of drying.

Forced air drying at 110°F. for 5 hours is also sufficient to evaporate a comparable quantity of water and permit dewaxing of the shell without blistering or exhibiting cracks.

Dewaxing

Dewaxing of the shells may be carried out by the normal procedures available; i.e., flash furnace dewaxing at 1,700°–1,900°F., steam autoclave dewaxing and solvent vapor dissolving of the wax.

Flash dewaxing is carried out by placing the shell assembly in a furnace previously heated at 1,700°–1,900°F. At these temperatures the wax is heated and expands, exerting an internal pressure on the shell structure. This pressure is relieved by the wax melting and running out the pouring cup in the shell assembly and also to a lesser extent permeating into the pores of the structures. Shell assemblies dried under controlled humidity and temperature conditions as well as forced air dried at 110°F. for 5 hours as cited previously, do not exhibit cracks or blisters and are suitable for metal casting.

Steam autoclave dewaxing, like furnace flash dewaxing, also depends on rapid heating of the wax and melting of it to relieve the internal pressure on the shell assembly. As a consequence, after loading the shell assemblies in an autoclave, steam pressure is raised as quickly as possible to promote rapid heating of the wax. Shell assemblies dewaxed in a steam autoclave exhibit crack free and blister free surfaces suitable for metal casting.

Solvent vapor elimination of the wax in shell assemblies is carried out with trichloroethylene vapor. The solvent is boiled in a lower portion of a degreasing tank and the vapors penetrate the pores of the refractory shell assembly and immediately dissolve the wax faces adjacent to the refractory investment before the heat of the solvent vapors expands the wax. Subsequently the bulk of the wax pattern is melted, but only after the internal pressure on the shell structure is relieved. Shell assemblies in which the wax is removed by the solvent vapor technique exhibit crack free and blister free shells suitable for metal casting.

Mechanism and Advantages

Although the mechanism by which the preferred process operates is not completely understood, it is believed the following explanation is consistent with the observed facts and would account for many of the advantages which accrue from use of the process. In the course of the process, the disposable pattern is dipped into a silica sol-grain slurry, drained, leaving a wet, negatively charged layer. After stuccoing and while the negatively charged layer is still wet the coated pattern is submerged into the positive solgrain slurry. The positively charged particles migrate or are attracted to the negatively charged colloidal silica coating, resulting in an instantaneous coagulation. At the same time (but at a slower rate) alkali from the collidal silica coating diffuses into the positive sol casting, neutralizing the acid and further polymerizing the basic aluminum ions on the surface of the preferred positive sol particles. This polymerization creates a continuous gel network around the wet shell which serves two important purposes:

1. It is the adhesive that holds the wet coating together and gives it the necessary strength to withstand redipping, and 2. It acts like a semipermeable membrane allowing water to pass but preventing the passage of alkali. The small amount of alkali that does enter the positive sol layer is neutralized and becomes part of the immobilized layer. As a result the excess positive sol slurry returning to the bath brings little or no alkali with it. This accounts for the unusual stability of the positive sol slurry.

The fact that the preferred positive sol coatings form layers of gel that inhibit migration of alkali makes it possible to use sodium silicate or other inexpensive alkaline ionic silicates for backup coats. This would not be possible if the sodium hydroxide were able to migrate inwardly, toward the pattern, during the shell buildup process, due to refractory problems in layers of the shell adjacent to the molten metal.

As indicated above, the wet gel strength of the coatings deposited by the process of this invention are high. The wet gel strength is the strength of the wet coating just before redipping into a slurry. If this strength is low, previous coatings will slough off during subsequent dipping operations. Gels from aqueous colloidal silica sols alone are weak and some drying between coats is usually required even where chemical setting agents are used. The preferred positive sol/negative sol coatings of this invention have unusually high wet gel strengths due to the polymerization of surface aluminum atoms on the positive sol particles, thus giving a system of wet coatings that readily withstand repeated (alternate) dippings with no sloughing off.

A further advantage of the process is that no special controls are needed to maintain slurry compositions. In present casting practices which contain a drying step between dips the colloidal silica binder, water and grain are consumed at different ratios. As a result the slurry composition is constantly changing. The quality of the shell is very sensitive to slurry composition. Changes in ratios can produce many problems such as weak shells (cracking), high viscosity (poor coverage of patterns), inclusions, "plus" metal and others.

Casters resolve this problem in different ways. Some have adopted slurry control techniques and analyze for individual components. Some keep operating until viscosity is too high and merely add silica sol to thin the slurry. Others operate until they have problems and then discard the "heel" or remaining slurry and reformulate However, there is no completely satisfactory solution.

In the present process the ingredients in both the positive sol and colloidal silica sol slurries are consumed in the essentially same ratios as they exist in the slurries. Therefore, no slurry control techniques are needed. Changes in viscosity do occur due to evaporation, but a given viscosity can be maintained simply by adding water periodically. In high volume plants dip tanks can be fed from large master batches and diluted to the desired viscosity with water.

Positive sol/negative sol coatings made by the process of this invention give refractory shells that are from 15 to 25 percent more porous than shells prepared in conventional manner from aqueous colloidal silica slurries. High porosity allows the water to leave readily during drying and firing. It is also necessary to allow trapped air to escape during metal pouring. The capability of producing shells with high porosity is therefore another valuable attribute of the present invention.

Other significant advantages of the invention have been mentioned above under "Summary of the Invention".

Examples

The following examples further illustrate the preferred process and products of this invention. In the examples percentages and parts are by weight unless otherwise specified.

EXAMPLE 1

A shell mold suitable for precision casting of metals is prepared according to the method of this invention in the following manner.

Two prime coat slurries are prepared by mixing 325 mesh zircon grain (No. 3 flour from Casting Supply House) with Positive Sol 130M, an acidic, aqueous dispersion of positively charged colloidal particles, on the one hand and with Ludox SM-30, a basic, aqueous silica sol on the other and stirring the mixtures for 24 hours before use. The compositions, giving a binder solids-to-zircon ratio of 0.09, are:

| | Parts by Wt. |
|---|---|
| Prime Coat Slurry A | |
| Zircon flour, 325 mesh | 77.0 |
| Positive Sol 130M (30% $SiO_2$-$Al_2O_3$) | 23.0 |
| Prime Coat Slurry B | |
| Zircon flour, 325 mesh | 77.0 |
| "Ludox" SM-30 (30% $SiO_2$) | 23.0 |

In the same manner two back-up coat slurries are prepared by mixing 200 mesh molochite grain (No. 6 flour, Casting Supply House) with Positive Sol 130M and Ludox SM-30 and stirring for 24 hours before use.

The compositions, giving a binder solids-to-molochite weight ratio of 0.24, are:

| | Parts by Wt. |
|---|---|
| Back-Up Coat Slurry C | |
| Molochite flour, 200 mesh | 55.5 |
| Positive Sol 130M (30% $SiO_2$-$Al_2O_3$) | 44.5 |
| Back-Up Coat Slurry D | |
| Molochite flour, 200 mesh | 55.5 |
| "Ludox" SM-30 (30% $SiO_2$) | 45.5 |

A wax pattern is cleaned in methyl ethyl ketone, air dried and dipped into prime coat slurry A until completely wetted. A wetting agent is not needed in A because the positively charged colloid serves this purpose. The pattern is withdrawn and drain of excess slurry and while still wet inserted into a fluidized bed containing zircon stucco grain (No. 1 zircon, −80 to +140 mesh, Casting Supply House). The purpose of stuccoing is to assist in building the mold to the dried thickness, to provide permeability needed in casting metals, and to give a roughened surface for better attachment of the next slurry coat.

Immediately, without drying, the pattern is dipped into prime coat slurry B, thoroughly wetted, withdrawn, drained of excess slurry and inserted into the zircon stucco bed.

Similarly, without drying, the pattern is given a back-up coat of slurry C and stuccoed with molochite grain (−30 to +60 mesh, Casting Supply House) in a fluidized bed.

Immediately, without drying, the pattern is given a back-up coat of slurry D and stuccoed with −30 to +60 mesh molochite grain in the bed.

Four additional back-up coats ar applied by alternating the procedure described for slurries C and D. The completed shell mold comprised of two prime coats and six back-up coats is fabricated in approximately 15 minutes. In each step of this operation a frim layer is added by the immobilizing chemical interaction of the acidic positive colloid and basic negative colloid. At no point is evidence of sloughing of a coating seen. Stabilities of the four slurries used in this procedure are shown to be unimpaired.

After air drying under ambient conditions for 24 hours the wax is removed from the mold by heating the coated pattern in a melt-out furnace at 1,700° to 1,800°F. for 2–3 minutes. The shell is heated an additional 20–30 minutes to ensure complete decarburization. The mold is free of cracks and other defects and ready for metal casting.

Subsequently, AMS 5382 high-temperature alloy (25% Cr, 10% Ni, 8% W and remainder Co, nominal analysis) is poured into the mold giving a sound casting.

Companion refractory bars are made from wax bars in the same manner as described in Example 1 and are tested for flexural strength in accordance with ASTM designation C 328-56: green flexural strengths on air dried bars range from 124 to 153 lbs./sq. in.; fired flexural strengths on bars heated at 1,750°F. for three/-fourths hour and cooled to room temperature range from 435 to 565 lb./sq. in.

EXAMPLE 2

A shell mold is prepared according to the method of this invention in a manner similar to that employed in Example 1.

The zircon prime coat slurries made with Positive Sol 130M and Ludox SM-30, designated A and B in Example 1, are used in constructing the mold.

In the manner of Example 1, two back-up coat slurries are prepared. Proportions of ingredients are formulated to give a binder solids-to-refractory grain ratio of 0.20. These are designated back-up slurries E and F:

| | Parts by Wt. |
|---|---|
| Back-up Coat Slurry E | |
| Molochite flour, 200 mesh | 60.0 |
| Positive Sol 130M (30% $SiO_2$-$Al_2O_3$) | 40.0 |
| Back-Up Coat Slurry F | |
| Molochite flour, 200 mesh | 60.0 |
| "Ludox" SM-30 (30% $SiO_2$) | 40.0 |

A shell mold is built up on a wax pattern in the manner employed in Example 1 except that the alternating routine is begun by applying a negative rather than a positive prime coat.

The pattern is cleaned in methyl ethyl ketone, air dried and dipped into a 1 percent solution of Cab-O-Sil M-5 in isopropyl alcohol and dried to make the surface wettable by the basic Ludox prime coat B.

The completed shell mold has two prime coats (B–A) and six back-up coats (F–E–F–E–F–E). The fabrication is accomplished in approximately 15 minutes. The coated wax pattern is air dried for 24 hours and fired in a furnace at 1,700°–1,800°F. to give a mold free of cracks and other defects and suitable for metal casting.

Companion test bars prepared according to this procedure have green flexural strengths ranging from 129 to 213 lb./sq. in. and fired flexural strengths ranging from 364 to 461 lg./sq. in.

EXAMPLE 3

A shell mold is prepared according to the method of this invention in a manner similar to that employed in Example 1.

The zircon prime coat slurries made with Positive Sol 130M and Ludox SM–30, designated A and B in Example 1, are used in constructing the mold.

In the manner of Example 1 two back-up coat slurries are prepared, except that in the present case the proportions of ingredients are formulated to give a binder solids-to-refractory grain ratio of 0.165. These are designated back-up coat slurries G and H:

| Back-up Coat Slurry G | Parts by Wt. |
|---|---|
| Molochite flour, 200 mesh | 64.5 |
| Positive Sol 130M (30% $SiO_2$- $Al_2O_3$) | 35.5 |
| Back-Up Coat Slurry H | |
| Molochite flour, 200 mesh | 64.5 |
| "Ludox" SM–30 (30% $SiO_2$) | 35.5 |

The shell mold is formed on the wax pattern using the same order of coat application as in Example 2, beginning with the basic slurry:

Two prime coats (B–A)
Six back-up coats (H–G–H–G–H–G)

Following drying and firing steps a mold free of cracks and defects is obtained.

Companion test bars have green flexural strengths ranging from 98 to 152 lb./sq. in. and fired flexural strengths ranging from 358 to 467 lb./sq. in.

EXAMPLE 4

A shell mold is prepared according to the method of this invention in a manner similar to that described in Example 1.

Two slurries are used in this example. One, designated J, is prepared by mixing Nalcast P1W fused silica flour (Nalco Chemical Co.) with Positive Sol 130M containing hydroxyacetic acid and stirring for 48 hours before use. The hydroxyacetic acid is required for stabilization purposes and is added with additional water to the Positive Sol 130M prior to the silica flour. Binder solids-to-refractory grain weight ratio is 0.10.

| Slurry J | Parts by Wt. |
|---|---|
| "Nalcast" P1W fused silica, 200 mesh | 70.1 |
| Positive Sol 130M (30% $SiO_2$-$Al_2O_3$) | 23.4 |
| Water | 6.0 |
| Hydroxyacetic Acid (70%, Tech.) | 0.5 |

The second slurry, designated K, is prepared by mixing Nalcast P1W silica with Ludox SM–30 and stirring for 48 hours. The binder solids-to-refractory grain weight ratio is 0.10.

| Slurry K | Parts by Wt. |
|---|---|
| "Nalcast" P1W fused silica, 200 mesh | 68.7 |
| "Ludox" SM–30 (30% $SiO_2$) | 22.9 |
| Water | 8.4 |

A shell mold is formed on a clean wax pattern in the manner described in Example 1, except in this case the two slurries serve for both prime and back-up coats:

Initially, a prime coat of slurry J is applied and stuccoed with Nalcast S–1 fused silica (Nalco Chemical Co.); this is immediately followed by a slurry of K stuccoed with Nalcast S–1.

Six back-up coats, beginning with J stuccoed with Nalcast S–2 fused silica (Nalco Chemical Co.), a coarser grain than S–1.

Complete fabrication of the shell requires only 15 minutes. The air dried and fired mold is free of cracks and other defects.

Companion test bars have green flexural strengths of 200–232 psi and fired flexural strengths of 730–890 psi.

EXAMPLE 5

A shell mold is prepared according to the method of this invention in a manner similar to that described in Example 1.

Four slurries are prepared for this work:

| Prime Coat Slurry L | Parts by Weight |
|---|---|
| "Nalcast" P1W fused silica, 200 mesh | 72.6 |
| Positive Sol 130M (30% $SiO_2$-$Al_2O_3$) | 12.0 |
| Water | 14.9 |
| Hydroxyacetic Acid (70%, Tech.) | 0.5 |
| Binder solids-to-refractory grain weight ratio is 0.05. | |
| Prime Coat Slurry M | |
| "Nalcast" P1W fused silica, 200 mesh | 71.6 |
| "Ludox" SM–30 (30% $SiO_2$) | 12.0 |
| Water | 16.4 |
| Binder solids-to-refractory grain weight ratio is 0.05. | |
| Back-Up Coat Slurry N | |
| "Nalcast" P2 fused silica, 100 mesh | 66.4 |
| Positive Sol 130M (30% $SiO_2$-$Al_2O_3$) | 33.2 |
| Hydroxyacetic Acid (70%, Tech.) | 0.4 |
| Binder solids-to-refractory grain weight ratio is 0.15. | |
| Back-Up Coat Slurry O | |
| "Nalcast" P2 fused silica, 100 mesh | 66.4 |
| "Ludox" SM–30 (30% $SiO_2$) | 33.6 |
| Binder solids-to-refractory grain weight ratio is 0.15. | |

A shell mold is formed on a clean wax pattern as described in Example 1. As in Example 4, hydroxyacetic acid is used to stabilize slurries comprised of Positive Sol 130M and fused silica.

Two prime coats, slurry L then M stuccoed with Nalcast S–1, are applied.

The remaining six coats are applied by alternate dips in slurry N then O, followed by stuccoing in a Nalcast S–2 fused silica fluidized bed.

All of the Nalcast silicas used in this preparation are products of the Nalco Chemical Company.

The entire operation requires only 15 minutes. After air drying under ambient conditions for 24 hours the wax is removed at 1,700°–1,800°F. to give a mold free of cracks and other defects. Companion test bars hav green flexural strengths of 100–110 psi and fired flexural strengths of 410–425 psi.

EXAMPLE 6

A shell mold is prepared according to the method of this invention in a manner similar to that described in Example 1.

Three slurries whose preparations are given in previous examples are used in constructing the mold:

| Prime Coat Slurry A (Example 1) | Positive Sol 130M-Zircon |
|---|---|
| Prime Coat Slurry B (Example 1) | "Ludox" SM–30-Zircon |

Back-Up Coat Slurry G      Positive Sol 130M-Molochite
(Example 3)

In addition, a second back-up slurry is prepared by mixing 200 mesh molochite grain with a solution of F Grade Sodium Silicate (Du Pont Co.) containing 15% $SiO_2$ and stirring for 24 hours before use. This composition, designated back-up coat slurry P, has a binder solids ($SiO_2$)-to-molochite weight ratio of 0.075:

| Back-Up Coat Slurry P | Parts by Weight |
|---|---|
| Molochite flour, 200 mesh | 66.7 |
| "F" Grade Sodium Silicate Solution (15% $SiO_2$) | 33.3 |

A wax pattern is given two prime coats, Slurry A then B, each stuccoed with No. 1 zircon grain. Six back-up cots are then applied, beginning with Slurry G, following with Slurry P, each stuccoed with −30 to +60 mesh molochite grain.

Very rapid setting of the back-up coats is seen due to the chemical interaction of the acidic positive colloid with the basic silicate.

Building of the mold through use of this alternate slurry technique requires about 17 minutes.

The air dried and fired mold has no cracks or other defects and is suitable for casting metals.

EXAMPLE 7

A shell mold is prepared as in Example 6 except Lithium Polysilicate 48 (20% $SiO_2$, Du Pont Co.) is used in place of sodium silicate in the back-up coat slurry.

The air dried and fired mold is free of cracks and other defects and is suitable for casting metals.

EXAMPLE 8

A shell mold is prepared as in Example 6 except No. 30 Potassium Silicate (20.8% $SiO_2$, Du Pont Co.) is used in place of sodium silicate in the back-up coat slurry.

The air dried and fired mold is crack-free and gives a metal casting with excellent surface definition.

EXAMPLE 9

A shell mold of excellent quality is prepared according to the procedure set forth in Example 1, using the compositions given therein with the exception that:

Positive Sol 130M is replaced in the prime coat and back-up coat slurries with another acidic, aqueous dispersion of positively charged colloidal particles which have acetate rather than chloride counter-ions and is referred to as an acetate positive sol. The sol has the following approximate chemical composition:

| | |
|---|---|
| % $SiO_2$ | 26.0 |
| % $Al_2O_3$ | 4.0 |
| % Acetic Acid | 4.7 |
| % $H_3BO_3$ | 1.6 |
| % $H_2O$ | 63.7 |

Physical and chemical properties of this acetate positive sol are similar to those of Positive Sol 130M.

EXAMPLE 10

A shell mold is prepared using prime coat Slurry A of Example 1 (Zircon-Positive Sol 130M) and back-up coat Slurry P of Example 6 (molochite-sodium silicate).

A wax pattern is given a single prime coat of Slurry A stuccoed with −80 to +140 mesh zircon grain and the remainder of the mold is built up of coatings of Slurry P stuccoed with −30 to +60 mesh molochite grain. The procedure for applying coatings and stuccoing is set forth in Example 1. The method of setting or immobilizing the back-up coatings is a unique feature of this invention:

After a back-up coating is applied and stuccoed the pattern is dipped into Positive Sol 130M, held for about 15 seconds, then dipped into water and soaked about 15 seonds to remove excess setting agent. No sloughing of coating or loosening of stucco grain is observed. The pattern is immediately given another coat of slurry. This sequence is repeated six times to form a mold approximately ⅜ inch thick within 20 minutes. The stability of the back-up coating composition is unaffected by this procedure.

The coated pattern is air dried for 24 hours and heated in a melt-out furnace for 25 minutes to give a mold free of cracks and with excellent surface definition.

EXAMPLE 11

A shell mold of excellent quality is prepared exactly as described in Example 10 except back-up coat Slurry H (molochite- Ludox SM–30) is employed in place of the molochite-sodium silicate Slurry P.

Although the invention has been described with particular reference to its preferred use in making expendable, refractory shell molds for precision investment casting of metals, it obviously can be adapted to many other useful purposes. In general it can be used in any case where it is desired to provide a high temperature resistant, heat insulating layer on the surfaces of an object such as an automobile muffler or manifold. For this purpse the slurries of negative sol or silicate and positive sol can include any desired refractory insulating material such as expanded perlite. Also the process can be used to provide high temperature resistant refractory coatings which are heat conductive by incuding a particulate refractory metal in the slurries. Since the slurries can be low viscosity the process can be adapted to the manufacture of a variety of intricate ceramic shapes on either disposale or permanent cores.

It is frequently desirable to include in the dip baths a fibrous reinforcing agent to improve the propertires of the resulting shell molds and other laminate articles. For example, significant increases in the green and fired strengths of investment casting molds of the invention can be attained by including in the dip baths a small amount of wollastonite (calcium metasilicate) fibers, Kaowool volcanic rock fibers, Fiberfrax aluminosilicate fibers, abestos fibers or glass fibers. Wollastonite and asbestos fibers gel the preferred positive sols, and therefore should be incorporated into the refractory laminates only by inclusion in the negative sol or silicate solution slurry baths.

We claim:

1. A rapid process for forming a refractory laminate on the surface of a support structure which comprises dipping the structure alternately, in either order, in
  1. a bath comprising at least one member of the group consisting of
    a. a sol of negatively charged colloidal particles selected from the group consisting of silica particles and bentonite, attapulgite and kaolinite clay particles and
    b. a solution of a quaternary ammonium, sodium, potassium or lithium silicate, and 2. a bath comprising a sol of positively charged colloidal particles selected from the group consisting of silica particles and alumina particles until a laminate of the desired thickness is built up on the surface.

2. Process of claim 1 wherein one dip bath comprises a slurry of particulate refractory material in a sol of negatively charged colloidal silica particles and the other dip bath comprises a slurry of particulate refractory material in a sol of positively charged colloidal particles composed of a silica core coated with a polyvalent metal-oxygen compound.

3. Process of claim 2 wherein the positively charged particles are composed of colloidal silica coated with alumina.

4. A rapid process for forming expendable, refractory shell molds for precision investment casting of metals which comprises dipping a disposable pattern of the metal casting alternately, in either order, in 1. a bath comprising at least one member of the group consisting of
    a. a sol of negatively charged colloidal particles selected from the group consisting of silica particles and bentonite, attapulgite and kaolinite clay particles, and
    b. a solution of a quaternary ammonium, sodium, potassium or lithium slicate, and 2. a bath comprising a sol of positively charged colloidal particles selected from the group consisting of silica particles and alumina particles, until a shell of the desired thickness is built up on the pattern.

5. Process of claim 4 wherein one dip bath comprises a slurry of refractory grain in a sol of negatively charged colloidal silica particles and the other dip bath comprises a slurry of refractory grain in a sol of positively charged colloidal particles composed of a silica core coated with a polyvalent metal-oxygen compound.

6. Process of claim 5 in which the positively charged particles are composed of colloidal silica coated with alumina.

7. Process of claim 6 wherein the pattern is first dipped in a first prime coat slurry comprising a relatively fine refractory grain in a sol of positively charged aumina-coated particles, then dipped in a second prime coat slurry comprising a relatively fine refractory grain in a so of negatively charge sol of negatively charged colloidal silica particles, then alternately dipped in a first back up coat clurry of a coarser refractory grain in a sol of positively charged alumina-coated colloidal particles and a second back up coat slurry of a coarser refractory grain in a sol of negatively charged colloidal silica particles.

8. Process of claim 7 wherein the coated pattern is stuccoed between each dip with a relatively coarse refractory grain.

9. Process of claim 6 wherein the pattern is dipped in a first prime coat slurry of a relatively fine refractory grain in a sol of negatively charged colloidal silica particles, then dipped in a second prime coat slurry of a relatively fine refractory grain in a sol of positively charged alumina-coated colloidal silica particles, then alternately dipped in a first back up coat slurry of a coarser grain in a sol of negatively charged colloidal silica particles and a second back up coat slurry of a coarser refractory grain in a sol of positively charged alumina-coated colloidal silica particles.

10. Process of claim 9 wherein the coated pattern is stuccoed between each dip with a relatively coarse refractory grain.

11. Process of claim 1 wherein one dip bath comprises a slurry of particulate refractory material in a solution of quaternary ammonium, sodium, potassium or lithium silicate and the other dip bath comprises a slurry of particulate refractory material in a sol of positively charged colloidal particles composed of a silica core coated with a polyvalent metal-oxygen compound.

* * * * * p0-1050
(5/69)

UNITED STATES PATENT OFFICE
CERTIFICATE OF CORRECTION

Patent No. 3,751,276      Dated August 7, 1973

Inventor(s) James N. Beyer, Earl P. Moore, Jr. & Robert L. Rusher

It is certified that error appears in the above-identified patent and that said Letters Patent are hereby corrected as shown below:

Column 22, line 8, "so" should read --sol--.

Column 22, line 8, at the end of the line, "sol of negatively charged" should be deleted.

Column 22, line 10, "clurry" should read --slurry--.

Column 22, line 8, "charge" should read -- charged -- .

Signed and sealed this 1st day of October 1974.

(SEAL)
Attest:

McCOY M. GIBSON JR.
Attesting Officer

C. MARSHALL DANN
Commissioner of Patents